United States Patent
Ollila

(10) Patent No.: US 11,956,555 B2
(45) Date of Patent: Apr. 9, 2024

(54) IMAGING WITH CAMERAS HAVING DIFFERENT DISTORTION PROFILES

(71) Applicant: Varjo Technologies Oy, Helsinki (FI)

(72) Inventor: Mikko Ollila, Tampere (FI)

(73) Assignee: Varjo Technologies Oy, Helsinki (FI)

( * ) Notice: Subject to any disclaimer, the term of this patent is extended or adjusted under 35 U.S.C. 154(b) by 140 days.

(21) Appl. No.: 17/749,666

(22) Filed: May 20, 2022

(65) Prior Publication Data

US 2023/0412932 A1    Dec. 21, 2023

(51) Int. Cl.
*H04N 23/951* (2023.01)
*G06T 3/00* (2006.01)
*G06T 5/00* (2006.01)

(52) U.S. Cl.
CPC ......... *H04N 23/951* (2023.01); *G06T 3/0093* (2013.01); *G06T 5/006* (2013.01)

(58) Field of Classification Search
None
See application file for complete search history.

(56) References Cited

U.S. PATENT DOCUMENTS

| | | | |
|---|---|---|---|
| 2010/0238327 A1 | 9/2010 | Griffith et al. | |
| 2014/0118569 A1* | 5/2014 | Griffith | H04N 5/272 348/218.1 |
| 2016/0057361 A1 | 2/2016 | Attar et al. | |
| 2018/0033155 A1* | 2/2018 | Jia | G06T 3/0093 |
| 2019/0102868 A1* | 4/2019 | Beric | G06T 5/006 |
| 2019/0250312 A1* | 8/2019 | Moon | G03B 3/10 |
| 2020/0252596 A1 | 8/2020 | Roulet et al. | |
| 2021/0014475 A1* | 1/2021 | Lee | H04N 13/239 |
| 2021/0235054 A1* | 7/2021 | Silverstein | G06F 3/013 |
| 2023/0094025 A1* | 3/2023 | Jiang | H04N 23/69 348/333.11 |

OTHER PUBLICATIONS

European Patent Office, Extended European Search Report, Application No. EP23170544, dated Oct. 16, 2023, 11 pages.

\* cited by examiner

*Primary Examiner* — Quan Pham
(74) *Attorney, Agent, or Firm* — Ziegler IP Law Group

(57) ABSTRACT

An imaging system includes first camera having negative distortion; second camera, second field of view of second camera being wider than first field of view of first camera, wherein first field of view fully overlaps with portion of second field of view, second camera having negative distortion at said portion and positive distortion at remaining portion; and processor(s) configured to: capture first image and second image; determine overlapping image segment and non-overlapping image segment of second image; and generate output image from first image and second image, wherein: inner image segment of output image is generated from at least one of: first image, overlapping image segment, and peripheral image segment of output image is generated from non-overlapping image segment.

25 Claims, 5 Drawing Sheets

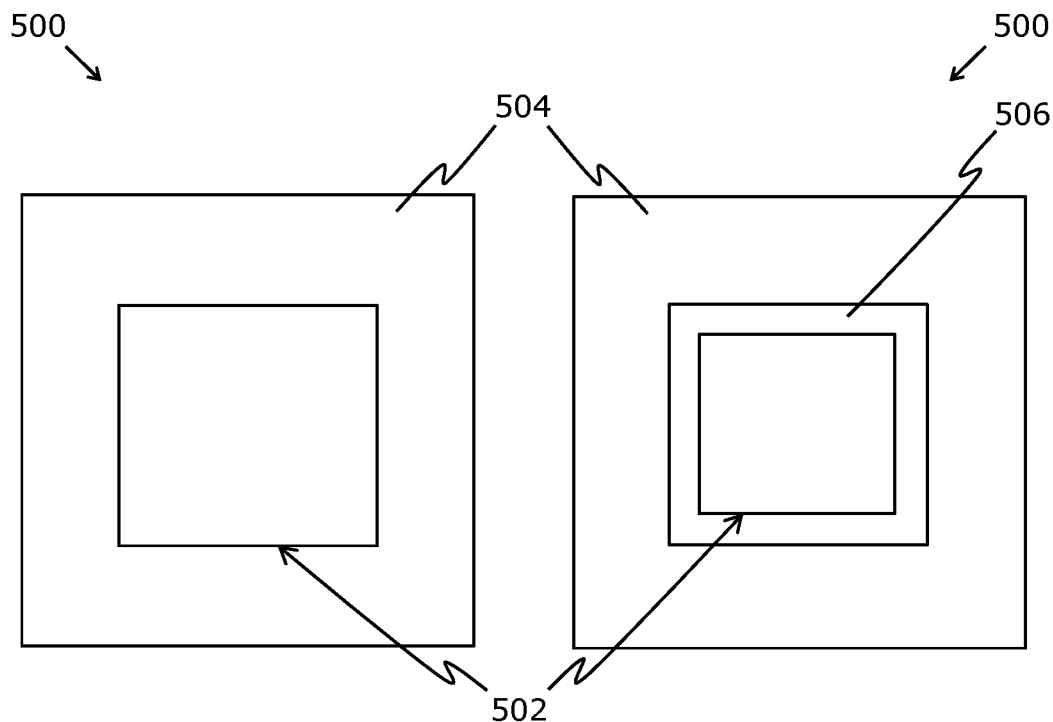
FIG. 5A
FIG. 5B
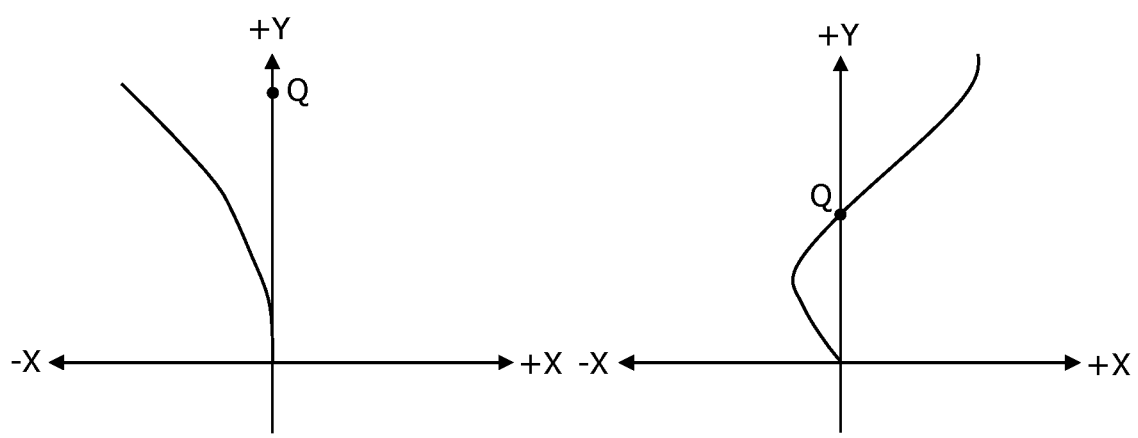
FIG. 6A
FIG. 6B

IMAGING WITH CAMERAS HAVING DIFFERENT DISTORTION PROFILES

TECHNICAL FIELD

The present disclosure relates to imaging systems employing cameras having different distortion profiles. The present disclosure also relates to devices employing cameras having different distortion profiles.

BACKGROUND

In recent times, there has been an ever-increasing demand for image capturing and processing. Such a demand may, for example, be quite high and critical in case of immersive extended-reality (XR) environments, which are being employed in various fields such as entertainment, real estate, training, medical imaging operations, simulators, navigation, and the like. Such immersive XR environments are presented to a user of an XR device (such as an XR headset, a pair of XR glasses, or similar). Several advancements are being made to develop image capturing and processing technology.

However, existing imaging systems and devices employing camera(s) have several problems associated therewith. The existing imaging systems and devices are inefficient in terms of generating images that have an acceptably high visual quality (for example, in terms of high resolution) throughout. This is because the existing imaging systems and devices are mostly designed to generate images according to a gaze direction of a user. Therefore, such systems and devices generate a high visual quality only in a gaze-contingent region of an image, and a relatively low visual quality in remaining region(s) (i.e., non-gaze-contingent region(s)) of the image. Resultantly, the generated image could only be employed for presentation to the user, but not for other usage, for example, such as generation of stereographic environment mapping (namely, depth mapping), object recognition, and the like.

Moreover, the existing imaging systems and devices are not well-suited for generating such high visual quality images along with fulfilling other requirements in XR devices, for example, such as small pixel size and high frame-rate requirements, interface and Analog-to-Digital Converter (ADC) requirements, and Image Processing System (IPS) data throughput. This is because only a limited number of pixels are available (due to limited camera sensor resolution, image signal processing (ISP), framerate, and a wide-angle field of view), and for generating high visual quality (or high-resolution) images, a greater number of pixels with a small pixel size are required.

Some existing imaging systems and devices employ cameras with negative distortion (such as fish-eye distortion) to cover a wide field of view. However, in such a case, optimum resolution is not obtained for images corresponding to the wide field of view. Furthermore, some other existing imaging systems and devices employ camera lenses having a mustache distortion, which has a positive distortion at a central region of a field of view of the camera lens, and a negative distortion at a peripheral region surrounding the central region (or the other way around). A human eye notices the moustache distortion as unrealistic and annoying. Typically, optical designers of the world are trying to keep distortion in a range between +/−2 to +3, because this is the limit where a human eye starts to notice the distortion in the captured images. Moreover, the moustache distortion is highly complex in nature, and thus requires considerable processing resources and time for its correction in the images. Furthermore, the mustache distortion is unavoidable, and due to limitations of optics, generation of high-resolution rectilinear images is difficult (especially for wide angle lenses). Thus, correction of such a distortion is highly expensive, and often results in a reduced modulation transfer function (MTF) resolution of the images. Resultantly, the images have poor visual quality, thereby leading to a sub-optimal (i.e., unrealistic), non-immersive viewing experience for a user viewing said images.

Referring to FIG. 1 (Prior Art), illustrated is an exemplary graphical representation of resolutions of images as a function of a half-angular width of a field of view of conventional cameras (not shown). In an example, a conventional imaging system comprises a first camera and a second camera, wherein the first camera is employed to capture images of a region of interest in a real-world environment, whilst the second camera is employed to capture images covering a larger field of view than the first camera. In the conventional imaging system, both the first camera and the second camera have negative distortion profiles.

A solid-line curve represents a resolution of a first image as a function of a half-angular width of a first field of view of the first camera. As shown, the resolution of the first image decreases from a central region of the first image corresponding to a half-angular width of the first field of view that ranges between 0 degrees to 20 degrees, to a remaining region of the first image corresponding to a half-angular width of the first field of view that ranges between 20 degrees to 70 degrees.

Moreover, a dotted-line curve represents a resolution of a second image as a function of a half-angular width of a second field of view of the second camera. As shown, the resolution of the second image consistently decreases from a central region of the second image to a remaining region of the second image. According to both the aforementioned curves, it can be inferred that an output image (generated using the first image and the second image) has a higher resolution only in a central region of the output image as compared to a remaining region of the output image.

Referring to FIG. 2 (Prior Art), illustrated is an exemplary comparison between an angular resolution of the output image and an angular resolution provided by a light source (for example, a display). A trend of the angular resolution of the output image is depicted using a dotted-line curve, whereas a trend of the angular resolution provided by the light source is depicted using a solid-line curve. As shown, the trend of the angular resolution of the output image does not suitably match with the trend of the angular resolution provided by the light source. In an example, for half-angular widths of field of view of the output image of 0, 5, 15, 25, 35, 45, 55, 65, and 75 degrees, the angular resolution (in pixels per degree) of the output image as compared to the angular resolution (in pixels per degree) provided by the light source may be (60 vs 50), (49 vs 48), (28 vs 47), (14 vs 49), (15 vs 43), (15 vs 37), and (13 vs 25), (10 vs 20), and (8 vs 18), respectively. According to both the aforementioned trends, it can be inferred the output image has a higher resolution only in a central region of the output image as compared to a remaining region of the output image.

Therefore, in light of the foregoing discussion, there exists a need to overcome the aforementioned drawbacks associated with the existing imaging systems and devices for generating images.

SUMMARY

The present disclosure seeks to provide an imaging system employing cameras having different distortion profiles.

The present disclosure also seeks to provide a device employing cameras having different distortion profiles. An aim of the present disclosure is to provide a solution that overcomes at least partially the problems encountered in prior art.

In one aspect, an embodiment of the present disclosure provides an imaging system comprising:

a first camera having a negative distortion;

a second camera, a second field of view of the second camera being wider than a first field of view of the first camera, wherein the first camera and the second camera are arranged in a manner that the first field of view fully overlaps with a portion of the second field of view, the second camera having a negative distortion at said portion of the second field of view and a positive distortion at a remaining portion of the second field of view; and at least one processor configured to:

control the first camera and the second camera to capture simultaneously a first image and a second image of a real-world environment, respectively;

determine an overlapping image segment and a non-overlapping image segment of the second image corresponding to said portion and the remaining portion of the second field of view, respectively; and generate an output image from the first image and the second image, wherein:

an inner image segment of the output image is generated from at least one of: the first image, the overlapping image segment of the second image, and a peripheral image segment of the output image is generated from the non-overlapping image segment of the second image, the peripheral image segment surrounding the inner image segment.

In another aspect, an embodiment of the present disclosure provides a device comprising:

a first camera per eye, the first camera having a negative distortion; at least one second camera, a second field of view of the at least one second camera being wider than a first field of view of the first camera, wherein the first camera and the at least one second camera are arranged in a manner that the first field of view fully overlaps with a portion of the second field of view, the at least one second camera having a negative distortion at said portion of the second field of view and a positive distortion at a remaining portion of the second field of view; and at least one processor configured to:

control the first camera and the at least one second camera to capture simultaneously a first image and a second image of a real-world environment, respectively;

determine an overlapping image segment and a non-overlapping image segment of the second image corresponding to said portion and the remaining portion of the second field of view, respectively; and generate an output image from the first image and the second image, wherein:

an inner image segment of the output image is generated from at least one of: the first image, the overlapping image segment of the second image, and a peripheral image segment of the output image is generated from the non-overlapping image segment of the second image, the peripheral image segment surrounding the inner image segment.

Embodiments of the present disclosure substantially eliminate or at least partially address the aforementioned problems in the prior art, and enable generation of output images having acceptably high quality throughout the field of view, by way of imaging with cameras having different distortion profiles, in real time or near-real time.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and instrumentalities disclosed herein. Moreover, those skilled in the art will understand that the drawings are not to scale. Wherever possible, like elements have been indicated by identical numbers.

Embodiments of the present disclosure will now be described, by way of example only, with reference to the following diagrams wherein:

FIGS. 5A and 5B illustrate various image segments of an output image, in accordance with different embodiments of the present disclosure;

FIG. 6A illustrates an exemplary graphical representation of a distortion profile of a first camera, while FIG. 6B illustrates an exemplary graphical representation of a distortion profile of a second camera, in accordance with an embodiment of the present disclosure;

FIG. 7A illustrates an exemplary graphical representation of resolutions of images as a function of a half-angular width of a field of view of cameras, while

Figure 1:
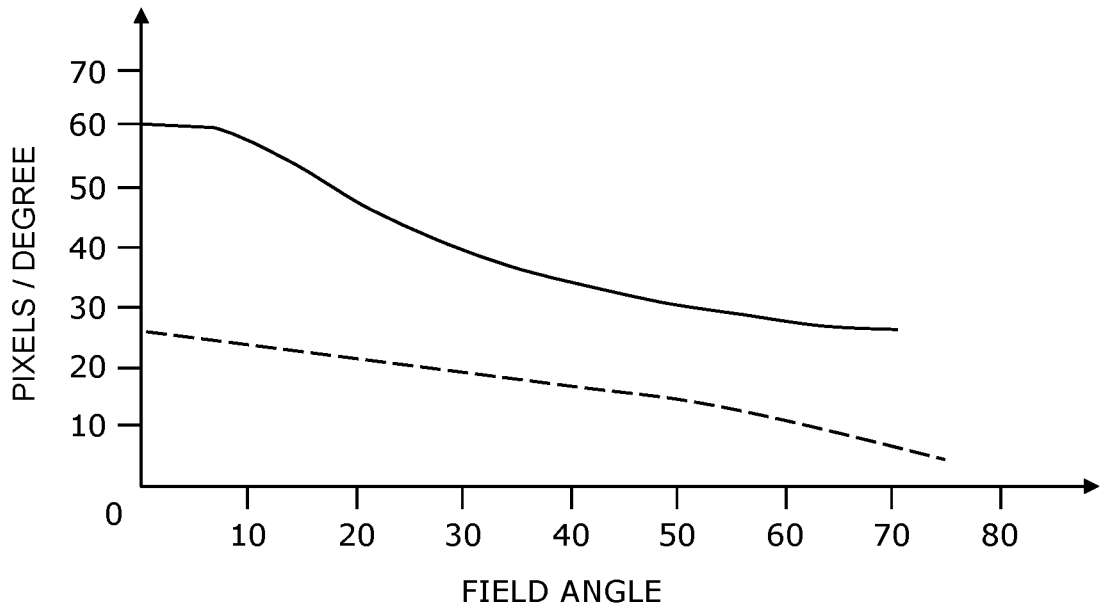
FIG. 1 (Prior Art) illustrates an exemplary graphical representation of resolutions of images as a function of a half-angular width of a field of view of conventional cameras.
Figure 2:
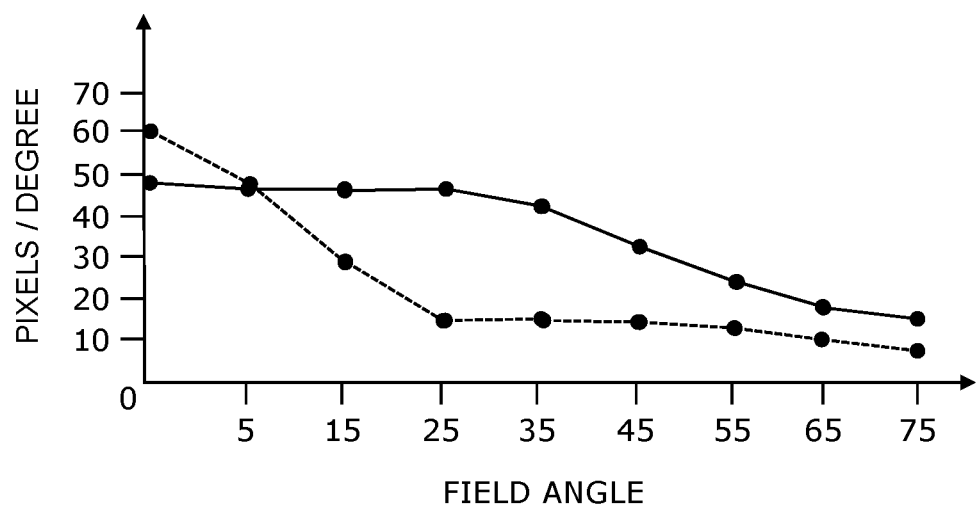
FIG. 2 (Prior Art) illustrates an exemplary comparison between an angular resolution of a conventional output image and an angular resolution provided by a light source.

In the accompanying drawings, an underlined number is employed to represent an item over which the underlined number is positioned or an item to which the underlined number is adjacent. A non-underlined number relates to an item identified by a line linking the non-underlined number to the item. When a number is non-underlined and accompanied by an associated arrow, the non-underlined number is used to identify a general item at which the arrow is pointing.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In one aspect, an embodiment of the present disclosure provides an imaging system comprising:
  a first camera having a negative distortion;
  a second camera, a second field of view of the second camera being wider than a first field of view of the first camera, wherein the first camera and the second camera are arranged in a manner that the first field of view fully overlaps with a portion of the second field of view, the second camera having a negative distortion at said portion of the second field of view and a positive distortion at a remaining portion of the second field of view; and
  at least one processor configured to:
    control the first camera and the second camera to capture simultaneously a first image and a second image of a real-world environment, respectively;
    determine an overlapping image segment and a non-overlapping image segment of the second image corresponding to said portion and the remaining portion of the second field of view, respectively; and
    generate an output image from the first image and the second image, wherein:
      an inner image segment of the output image is generated from at least one of: the first image, the overlapping image segment of the second image, and
      a peripheral image segment of the output image is generated from the non-overlapping image segment of the second image, the peripheral image segment surrounding the inner image segment.

In another aspect, an embodiment of the present disclosure provides a device comprising:
  a first camera per eye, the first camera having a negative distortion; at least one second camera, a second field of view of the at least one second camera being wider than a first field of view of the first camera, wherein the first camera and the at least one second camera are arranged in a manner that the first field of view fully overlaps with a portion of the second field of view, the at least one second camera having a negative distortion at said portion of the second field of view and a positive distortion at a remaining portion of the second field of view; and at least one processor configured to:
    control the first camera and the at least one second camera to capture simultaneously a first image and a second image of a real-world environment, respectively;
    determine an overlapping image segment and a non-overlapping image segment of the second image corresponding to said portion and the remaining portion of the second field of view, respectively; and
    generate an output image from the first image and the second image, wherein:
      an inner image segment of the output image is generated from at least one of: the first image, the overlapping image segment of the second image, and
      a peripheral image segment of the output image is generated from the non-overlapping image segment of the second image, the peripheral image segment surrounding the inner image segment.

The present disclosure provides the aforementioned imaging system and the aforementioned device employing cameras having different distortion profiles. Herein, the output image is generated using the first image (that is captured by the first camera having negative distortion) and different image segments of the second image (that is captured by the second camera having negative distortion and positive distortion in different portions) in a manner that the output image has an acceptably high visual quality (for example in terms of high resolution) throughout. Advantageously, the (generated) output image is not only suitable for displaying purposes, but also for other usage, for example such as generation of stereographic environment mapping (namely, depth mapping), object recognition, and the like. Moreover, the imaging system and the device are well-suited for generating such high visual quality output images along with fulfilling other requirements in XR devices such as small pixel size and high frame-rate requirements. The imaging system and the device are simple, robust, fast, reliable and can be implemented with ease. It will be appreciated that the output image is generated in real time or near-real time (i.e., without any latency/delay). Furthermore, the output images generated by the imaging system are free from any noticeable distortion (such as moustache distortion) as the second camera has the negative distortion at said portion of the second field of view, and the positive distortion at the remaining portion (but not the other way round), which distortion are rectified prior to presenting the output image to a user. Moreover, an amplitude of distortion is very high as compared to conventional lenses, and a cross-over point (for change from the negative distortion to the positive distortion) is clearly defined.

It will be appreciated that the imaging system enables in providing a focal length variation that subsequently leads to a change in resolution (for example, in terms of pixel per degree (PPD)) of the images. Thus, effective resolution of the images is better as compared to a resolution that is lost due to a drop in the MTF resolution of the images (due to un-distortion). Moreover, even when a magnitude of the distortion is high and distortion correction is required, a resolution of the images (generated by the imaging system) is considerably high, and thus there is a high visual fidelity in the images. Also, the effective resolution of the images is higher than a resolution provided by a rectilinear lens.

The device could be arranged at a fixed location within the real-world environment. Optionally, in such a case, the device is stationary in the real-world environment. Additionally or alternatively, the device could be a wearable device being worn by a user present in the real-world environment. In such a case, the location of such a device changes with a change in a location of its user. Likewise, the device could be arranged on, for example, a drone, a robot, or similar. As an example, the device could be arranged on a support structure that is capable of a three-dimensional (3D) rotation (and additionally, capable of a translation motion). The support structure can be moved to any required location in the real-world environment.

As an example, the device may be implemented as a head-mounted display (HMD) device, a teleport device, and the like. The term "head-mounted display" device refers to a specialized equipment that is configured to present an extended-reality (XR) environment to a user when said HMD device, in operation, is worn by the user on his/her head. The HMD device is implemented, for example, as an XR headset, a pair of XR glasses, and the like, that is operable to display a visual scene of the XR environment to the user. The term "extended-reality" encompasses virtual reality (VR), augmented reality (AR), mixed reality (MR), and the like. The term "teleport device" refers to a specialized equipment that is capable of facilitating virtual teleportation.

In an example implementation, the device is implemented as an HMD device, wherein the HMD device comprises one first camera per eye and one second camera per eye. In such an implementation, a first camera and a second camera corresponding to a first eye of the user and a first camera and a second camera corresponding to a second eye of the user may be arranged to face the real-world environment in a manner that a distance between cameras corresponding to the first eye and cameras corresponding to the second eye is equal to an interpupillary distance (IPD) between the first eye and the second eye.

In another example implementation, the device is implemented as a teleport device, wherein the teleport device comprises one first camera per eye and one second camera shared between two eyes. In such an implementation, a first camera corresponding to a first eye of the user and a first camera corresponding to a second eye of the user may be arranged to face the real-world environment in a manner that a distance between cameras corresponding to the first eye and the second eye is equal to the IPD between the first eye and the second eye. Moreover, the second camera could be arranged at a centre of the IPD (i.e., in between both the first cameras).

Throughout the present disclosure, the term "camera" refers to an equipment that is operable to detect and process light signals received from the real-world environment, so as to capture image(s) of the real-world environment. Optionally, a given camera is implemented as a visible-light camera. The term "given camera" encompasses the first camera, the second camera, as well as both the first camera and the second camera. Examples of the visible-light camera include, but are not limited to, a Red-Green-Blue (RGB) camera, a Red-Green-Blue-Alpha (RGB-A) camera, a Red-Green-Blue-Depth (RGB-D) camera, an event camera, and a monochrome camera. Alternatively, optionally, the given camera is implemented as a combination of a visible-light camera and a depth camera. Examples of the depth camera include, but are not limited to, a Red-Green-Blue-Depth (RGB-D) camera, a ranging camera, a Light Detection and Ranging (LiDAR) camera, a Time-of-Flight (ToF) camera, a Sound Navigation and Ranging (SONAR) camera, a laser rangefinder, a stereo camera, a plenoptic camera, and an infrared (IR) camera. As an example, the given camera may be implemented as the stereo camera. It will be appreciated that since the second field of view is wider than the first field of view, the first camera may be considered to be a wide-angle camera, while the second camera may be considered to be an ultra-wide-angle camera.

Optionally, the first camera has an adjustable focus. This means that the first camera is focusable, i.e., a focal plane of at least one optical element (for example, a camera lens) of the first camera is adjustable. Such an adjustment facilitates in capturing sharp images of objects present in the real-world environment. In some implementations, an optical focus of the first camera is adjusted, based on an optical depth of an object that is being observed by a user of a given device. The optical depth may be determined based on a gaze direction of the user. The optical focus of the first camera may be adjusted in a step-wise manner. A focus range of the first camera may provide a range of optical depths on which the first camera focuses within the real-world environment. When a given step is employed for focusing the first camera, the optical focus of the first camera is adjusted to lie at a given optical depth.

In other implementations, the optical focus of the first camera is adjusted, based on a pre-defined manual setting. As an example, an optical focus of the first camera of the device may be adjusted based on an average of gaze-directions of multiple users, when the output image is to be presented to the multiple users. This may be particularly applicable in a case where the device is a teleport device.

In yet other implementations, the optical focus of the first camera is adjusted, based on information pertaining to a visual scene of the XR environment. As an example, in an XR educational conference wherein a real object (for example, such as a jet engine) is being observed by multiple users, the optical focus of the first camera may be adjusted in a manner that the real object could be clearly observed by the multiple users.

It will be appreciated that for a given camera having a negative distortion across a field of view of the given camera, a focal length of the given camera would be higher at a central region of the field of view, as compared to a peripheral region of the field of view. In such a case, the focal length of the given camera may be suitably adjusted for capturing a high-resolution image corresponding to the central region of the field of view. On the other hand, for a given camera having a positive distortion across a field of view of the given camera, a focal length of the given camera would be higher at a peripheral region of the field of view, as compared to a central region of the field of view. In such a case, the focal length of the given camera may be suitably adjusted for capturing a high-resolution image corresponding to the peripheral region of the field of view. This can be attributed to the fact that a resolution (for example, in terms of PPD) is dictated by the focal length of the given camera and a pixel size of a camera sensor. Greater the focal length and lesser the pixel size, greater is the resolution.

Thus, the optical focus of the first camera can be adjusted to capture a high-resolution image of objects present in the central region of the first field of view, while the optical focus of the second camera can be adjusted to capture a high-resolution image of objects present in the peripheral region of the second field of view. As a result, the output image has an overall high visual quality throughout the field of view.

Optionally, in this regard, the second camera has an adjustable focus. This means that the second camera is focusable, i.e., a focal plane of at least one optical element (for example, a camera lens) of the second camera is adjustable. It will be appreciated that since the second camera has the positive distortion in the remaining portion of the second field of view, the second camera could have a greater focal length corresponding to the peripheral region of the second field of view, as compared to a central region of the second field of view. Therefore, focussing the second camera (namely, adjusting an optical focus of the second camera) based on real-world objects present at the peripheral region is beneficial, for example, in capturing sharp (and high-resolution) images of said objects. It will be appreciated that the second camera is designed in a manner that the optical focus of the second camera is automatically adjusted at a required focus plane corresponding to the peripheral region of the second field of view.

Alternatively, optionally, the second camera is focus free. This means that the second camera has a non-adjustable focus. In this regard, the second camera has a fixed optical focus. A focal plane of at least one optical element (for example, a camera lens) of the second camera may be fixed at a hyperfocal distance. As an example, the optical focus of the second camera may lie at an infinity. It will be appreciated that having the second camera focus free facilitates in simplifying an overall design and working of the second camera, without compromising on an image quality of the second image. This also facilitates in implementing the imaging system with minimal complexity.

Optionally, an optical axis of the second camera is arranged at an angle that is lower than a predefined threshold angle with respect to an optical axis of the first camera, such that the first field of view fully overlaps with the portion of the second field of view. In such a case, the first field of view could be (almost) at a middle of the second field of view. Beneficially, this facilitates in easily and accurately determining the image segments of the second image as the overlapping image segment of the second image (that corresponds to the portion of the second field of view and to the first field of view) could lie (almost) at a middle of the second image. Optionally, the predefined threshold angle lies in a range of 5 degrees to 30 degrees. As an example, the predefined threshold angle may be from 5, 10, 15 or 20 degrees up to 10, 20 or 30 degrees. More optionally, the predefined threshold angle lies in a range of 10 degrees to 25 degrees.

It will be appreciated that since a distortion profile of the second camera depends on its arrangement with respect to the portion of the second field of view that fully overlaps with the first field of view, a relative arrangement of the first camera and the second camera may be fixed. In other words, the first camera and the second may not be tilted individually, but the first camera and the second could be tilted together based on the gaze direction of the user. However, such a tilting need not be a physical tilting of these cameras, as the first image and the second image could also be processed (for example, such as to crop these images), based on the gaze direction of the user.

When a given image is captured by the given camera, a spatial distortion (i.e., an optical aberration) is introduced in the given image due to optical properties and/or arrangement of components (for example, at least one optical element (such as, a camera lens, a mirror, a configuration of lenses and/or mirrors, or similar), a camera chip, and the like) of the given camera, closeness of a targeted region within the real-world environment and the given camera, and other factors. The spatial distortion could be a negative distortion (namely, a barrel distortion or a fish-eye distortion) or a positive distortion (namely, a pincushion distortion). The aforesaid types of distortion are well-known in the art.

Notably, an entirety of the first field of view has the negative distortion, whereas an overlapping portion of the second field of view (that overlaps with the first field of view) has the negative distortion and a non-overlapping portion of the second field of view (that does not overlap with the first field of view) has the positive distortion.

Optionally, a value of the negative distortion of the first camera lies in a range of −20 to −90. As an example, the value of the negative distortion of the first camera may be from −20, −25, −30, −40 or −50 up to −60, −70, −80 or −90. More optionally, the value of the negative distortion of the first camera lies in a range of −20 to −70. Yet more optionally, the value of the negative distortion of the first camera lies in a range of −30 to −50.

Optionally, a value of the negative distortion of the second camera at said portion of the second field of view lies in a range of 0 to −40, more optionally, in a range of −20 to −40. As an example, the value of the negative distortion of the second camera at said portion of the second field of view may be from 0, −5, −10, −15, −20 or −25 up to −20, −30 or −40. More optionally, the value of the negative distortion of the second camera at said portion of the second field of view lies in a range of 0 to −20. Yet more optionally, the value of the negative distortion of the second camera at said portion of the second field of view lies in a range of −10 to −30.

Optionally, a value of the positive distortion of the second camera at the remaining portion of the second field of view lies in a range of +3 to +40.

As an example, the value of the positive distortion of the second camera at the remaining portion of the second field of view may be from +3, +5, +10, +15 or +25 up to +20, +30 or +40. More optionally, the value of the positive distortion of the second camera at the remaining portion of the second field of view lies in a range of +10 to +40. Yet more optionally, the value of the positive distortion of the second camera at the remaining portion of the second field of view lies in a range of +20 to +40.

Moreover, optionally, an average distortion across an entirety of the second field of view of the second camera is within a predefined value from a distortion at an edge of at least one light source via which the output image is to be displayed. The predefined value may lie in a range of 3 to 15. As an example, if the predefined value is 3, the average distortion would be within +/−3 from the distortion at the edge of the at least one light source. It will be appreciated that the distortion at the edge of the at least one light source (for example, a display) arises due to one or more of: ocular characteristics of the user's eye, pixel geometry of the at least one light source, optical characteristics of optics employed in the at least one light source. Such distortion is corrected to some extent by suitable correction algorithms well known in the art.

Resultantly, the second field of view of the second camera accurately matches with a field of view of at least one light source. Every pixel that is read in the second camera is also accurately displayed via the at least one light source. This may be particularly applicable in a case where the device is an HMD device. In other words, a distortion profile of the second camera is matched with a form factor of the at least one light source. The form factor of the at least one light source may, for example, be a rectangle, a rectangle having rounded corners, or similar. For illustration purposes, there will now be considered an example implementation in which a field of view of a second camera is 130 degrees×105 degrees (which is 167 degrees diagonally), but a field of view of a light source is 140 degrees diagonally. Without the imaging system pursuant to embodiments of the present disclosure, an image corresponding to only 140 degrees out of 167 degrees of the field of view of the second camera would be displayed via the light source, thereby wasting remaining 27 degrees of the field of view of the second camera. On the other hand, pursuant to embodiments of the present disclosure, the field of view of the second camera is matched with the field of view of the light source, such that an image corresponding to an entirety of the field of view of the second camera would be displayed via the light source.

More optionally, the average distortion is zero. In this regard, the second camera is designed in a manner that the average distortion is almost zero.

It will be appreciated that the average distortion is determined as an average (namely, a mean) of the negative distortion and the positive distortion across the entirety of the second field of view. Moreover, the average distortion is only determined for the second camera. There is no need to determine an average distortion for a combination of the first camera and the second camera, because the average distortion that is determined for the second camera is sufficient for matching (the entirety of) the second field of view with the field of view of the at least one light source, as the first field of view (being considerably smaller than the second field of view) is utilized only for a central portion of the field of view of the at least one light source.

Optionally, a distortion of a given camera is a function of a radial field of view of the given camera. Such a function facilitates in providing a smooth (i.e., non-abrupt) change in between a positive distortion and a negative distortion. Furthermore, the at least one light source may have a resolution that is different along a horizontal direction and a vertical direction. Thus, the distortion could also be a function of a direction, in addition to the radial field of view of the given camera.

Optionally, the first field of view has an angular width that lies in a range of 45 degrees to 150 degrees. As an example, the first field of view has the angular width may be from 45, 50, 60, 70, 85, 100 or 120 degrees up to 80, 90, 110, 130 or 150 degrees. More optionally, the first field of view has the angular width that lies in a range of 45 degrees to 100 degrees.

Optionally, the second field of view has an angular width that lies in a range of 50 degrees to 220 degrees. As an example, the second field of view has the angular width may be from 50, 60, 75, 90, 110, 130 or 160 degrees up to 120, 135, 150, 180 or 220 degrees. More optionally, the second field of view has the angular width that lies in a range of 50 degrees to 180 degrees.

Notably, the at least one processor controls an overall operation of the imaging system. The at least one processor is communicably coupled to at least the first camera and the second camera. The at least one processor may be understood to be a compositor (namely, a processing unit configured to perform at least compositing tasks pertaining to generation of the output image). The compositor is a software module taking various inputs (such as the first image and the second image) and composing (namely, generating) the output image (that is to be subsequently optionally displayed via at least one light source).

The first image and the second image of the real-world environment are captured at a same time, via the first camera and the second camera, respectively. Notably, since the second field of view is wider than the first field of view, and the first field of view fully overlaps with the portion of the second field of view, the first image represents a given region of a real-world scene (that corresponds to the first field of view), whereas the second image represents other region(s) of the real-world scene (that corresponds to the remaining (non-overlapping) portion of the second field of view) in addition to the given region of the real-world scene.

Throughout the present disclosure, the term "image segment" of the second image refers to a part of the second image that corresponds to a given portion of the second field of view. The overlapping image segment of the second image represents the given region of the real-world scene, whereas the non-overlapping image segment of the second image represents the other region(s) of the real-world scene. It will be appreciated that a given image segment (i.e., the overlapping image segment and/or the non-overlapping image segment) of the second image may or may not have a defined shape and/or size.

Since the first image and the second image are accurately captured by the first camera and the second camera, respectively, and are readily available to the at least one processor, the at least one processor can easily determine the overlapping image segment as the overlapping image segment corresponds to the first image itself. Optionally, in this regard, the at least one processor is configured to compare features extracted from the first image with features extracted from the second image, and a part of the second image whose features correspond to the features extracted from the first image is determined (namely, identified) as the overlapping image segment. In such a case, a remaining image segment of the second image (that does not correspond to the first image) is determined as the non-overlapping image segment.

Optionally, a resolution of the first image lies in a range of 20 pixels per degree to 120 pixels per degree. As an example, the resolution of the first image may be from 20, 25, 35, 50, 70 or 90 pixels per degree up to 60, 80, 100 or 120 pixels per degree. More optionally, the resolution of the first image lies in a range of 30 pixels per degree to 100 pixels per degree.

Optionally, a resolution of the overlapping image segment of the second image lies in a range of 15 pixels per degree to 100 pixels per degree, and a resolution of the non-overlapping image segment of the second image lies in a range of 20 pixels per degree to 120 pixels per degree. As an example, the resolution of the overlapping image segment of the second image may be from 15, 20, 30, 45, 60 or 75 pixels per degree up to 70, 80, 90 or 100 pixels per degree, and the resolution of the non-overlapping image segment of the second image may be from 20, 25, 35, 50, 70 or 90 pixels per degree up to 60, 80, 100 or 120 pixels per degree. It will be appreciated that when the resolution of the first image and the resolution of the overlapping image segment of the second image are different, a pixel size of a pixel of the first image and a pixel size of a pixel of the overlapping image segment are also different.

Optionally, the at least one processor is configured to warp one of the first image and the second image to match a perspective from which another of the first image and the second image is captured, prior to generating the output image from the first image and the second image. In this regard, since the optical axis of the first camera and the optical axis of the second camera are different, a viewpoint and a view direction of the first camera that is used to capture the first image and a viewpoint and a view direction of the second camera that is used to capture the second image would be different. Resultantly, there would always be some offset/skewness between the first image and the second image. In such a case, the at least one processor is configured to re-project (namely, warp) the one of the first image and the second image to match the perspective from which the another of the first image and the second image is captured, according to a difference in the viewpoints and the view directions of the first camera and the second camera. Beneficially, this subsequently facilitates in accurately generating the output image from the first image and the second image. Optionally, when warping the one of the first image and the second image, the at least one processor is configured to employ at least one image reprojection algorithm. The at least one image reprojection algorithm comprises at least one space warping algorithm. It will be appreciated that since the second field of view is wider than the first field of view, and the first field of view fully overlaps with the portion of the second field of view, it may be preferred that the second image is warped to match a perspective from which the first image is captured.

Optionally, the at least one processor is configured to generate the inner image segment of the output image from one of the first image and the overlapping image segment whose resolution is greater than a resolution of other of the first image and the overlapping image segment. This is because the one of the first image and the overlapping image segment comprises more comprehensive and precise information pertaining to the real-world scene (due to a higher resolution), as compared to the other of the first image and the overlapping image segment. In this regard, a pixel value of a pixel in the inner image segment is generated to be same as a pixel value of a corresponding pixel of the one of the first image and the overlapping image segment. It will be appreciated that the term "pixel value" of a pixel encompasses not only colour information to be represented by the pixel, but also other attributes associated with the pixel (for example, such as depth information, brightness information, transparency information, luminance information, and the like).

Alternatively, optionally, the at least one processor is configured to generate a pixel value of a pixel in the inner image segment, based on a weighted sum or a weighted average of a pixel value of a corresponding pixel of the first image and a pixel value of a corresponding pixel of the overlapping image segment. Thus, the pixel in the inner image segment of the output image is generated by combining the corresponding pixel of the first image and the corresponding pixel of the overlapping image segment. Moreover, different weight factors (for example, ranging from 0 to 1) could be applied to pixel values of corresponding pixels in the first image and the overlapping image segment. As an example, when the resolution of the first image is greater than the resolution of the overlapping image segment, a higher weight factor may be applied to the pixel value of the corresponding pixel of the first image, as compared to the pixel value of the corresponding pixel of the overlapping image segment, and vice versa. As another example, when the resolution of the first image is same as the resolution of the overlapping image segment, a weight factor of 0.50 may be used for both pixels of the first image and pixels of the overlapping image segment. In an example, a weight factor of 0.85 may be applied to the pixel value of the corresponding pixel of the first image, and a weight factor of 0.15 may be applied to the pixel value of the corresponding pixel of the overlapping image segment.

It will be appreciated that even when the first image has negative distortion, a resolution of the (generated) inner image segment of the output image would still be high. This is because the first field of view is much narrower than the second field of view, and pixels of a sensor chip of the first camera receive light from the narrower first field of view; as a result, the first image captures a greater detail of information pertaining to region(s) represented by the first image.

Furthermore, optionally, the at least one processor is configured to generate a pixel value of the pixel in the peripheral image segment of the output image to be same as a pixel value of a corresponding pixel in the non-overlapping image segment of the second image. Since the non-overlapping image segment of the second image has a positive distortion, a resolution of the (generated) peripheral image segment would be high. The inner image segment and the peripheral image segment of the output image are digitally combined to generate the output image.

Optionally, a pixel in an intermediate image segment between the inner image segment and the peripheral image segment is generated by combining a corresponding pixel of the first image with a corresponding pixel of the overlapping image segment of the second image. It will be appreciated that the intermediate image segment is generated to provide a smooth transition (namely, gradual blending or fusion) between the inner image segment and the peripheral image segment. In other words, by generating the intermediate image segment, a smooth imperceptible transition is provided between the inner image segment and the peripheral image segment, as the inner image segment appears to be well-blended with the peripheral image segment when pixel(s) in the intermediate image segment is/are generated according to the aforesaid combination of corresponding pixels. Beneficially, this improves immersiveness and realism of user's viewing experience when the output image is presented to the user.

Optionally, such combining is performed by employing at least one of: Poisson blending, image blending using Laplacian pyramids, linear blending. Optionally, the at least one processor is configured to generate the pixel in the intermediate image segment, based on the weighted sum or the weighted average of the pixel value of the corresponding pixel of the first image and the pixel value of the corresponding pixel of the overlapping image segment.

Optionally, a width of the intermediate image segment lies in a range of 1 pixel to 100 pixels. As an example, a width (namely, thickness) of the intermediate image segment may be 1, 10, 20, 35 or 50 pixels up to 50, 70, 85 or 100 pixels. Alternatively, optionally, a width of the intermediate image segment ranges from 1 percent to 10 percent of a width of the inner image segment. For example, given that the width of the inner image segment is W1 pixels, the width of the intermediate image segment may be 0.01*W1, 0.02*W1, 0.03*W1, 0.04*W1, 0.05*W1, 0.06*W1, 0.07*W1, 0.08*W1, 0.09*W1 or 0.10*W1 pixels. It will be appreciated that in some implementations, there is no intermediate image segment between the inner image segment and the peripheral image segment.

Optionally, a value of the distortion of the second camera at a boundary between the portion of the second field of view and the remaining portion of the second field of view lies in a range of −3 to +3. As an example, the value of the distortion of the second camera at a boundary between the portion of the second field of view and the remaining portion of the second field of view may be from −3, −2, −1 or 0 up to 0, +1, +2 or +3. More optionally, the value of the distortion of the second camera at the boundary between the portion of the second field of view and the remaining portion of the second field of view lies in a range of −1 to +2.

The present disclosure also relates to the device as described above. Various embodiments and variants disclosed above, with respect to the aforementioned first aspect, apply mutatis mutandis to the device.

Notably, the at least one processor controls an overall operation of the device. The at least one processor is communicably coupled to at least the first camera and the at least one second camera. As an example, the device could be implemented as an HMD device or a teleport device.

Optionally, the device further comprises at least one light source per eye, wherein the at least one processor is configured to display the output image via the at least one light source. In such a case, the at least one processor is communicably coupled to the at least one light source. Upon generating the output image, the at least one processor communicates the output image to the at least one light source of the device, for subsequently displaying the output image thereat. The term "light source" refers to an element from which light emanates. The at least one light source is driven to display a sequence of output images. Optionally, a given light source is implemented as a display. In this regard, an output image is displayed at the display. Examples of such a display include, but are not limited to, a Liquid Crystal Display (LCD), a Light-Emitting Diode (LED)-based display, an Organic LED (OLED)-based display, a micro OLED-based display, an Active Matrix OLED (AMOLED)-based display, and a Liquid Crystal on Silicon (LCoS)-based display. Alternatively, optionally, a given light source is implemented as a projector. In this regard, an output image is projected onto a projection screen or directly onto a retina of the user's eyes. Examples of such a projector include, but are not limited to, an LCD-based projector, an LED-based projector, an OLED-based projector, an LCoS-based projector, a Digital Light Processing (DLP)-based projector, and a laser projector. It will be appreciated that the (generated) output image is not only suitable for displaying it to the user, but also for other usage, for example such as generation of stereographic environment mapping (namely, depth mapping), object recognition, and the like.

Optionally, the device further comprises pose-tracking means. Optionally, a server, communicably coupled to the device, is configured to: collect, from the device, a plurality of output images, along with pose information indicative of poses of the device; and process the plurality of output images, based on the pose information, to generate a three-dimensional (3D) model of the real-world environment. Herein, the term "three-dimensional model" of the real-world environment refers to a data structure that comprises comprehensive information pertaining to a 3D space of the real-world environment. Such a comprehensive information is indicative of at least one of: a plurality of features of objects or their portions present in the real-world environment, shapes and sizes of the objects or their portions, poses of the objects or their portions, materials of the objects or their portions, colours of objects or their portions. The 3D model may be generated in a form of a 3D polygonal mesh, a 3D point cloud, a 3D surface cloud, a 3D surflet cloud, or similar. The server may be configured to store the 3D model at a data repository communicably coupled to the server. The data repository may be implemented as a memory of the server, a cloud-based database, or similar. Upon generating the 3D model, the server may utilize subsequent output image(s) to update the 3D model. Moreover, the pose-tracking means may employ an outside-in tracking technique, an inside-out tracking technique, or a combination of both the aforesaid techniques, for collecting pose-tracking data. Such techniques are well-known in the art. The pose-tracking data may be in form of images, IMU/TIMU values, motion sensor data values, magnetic field strength values, or similar.

Prior to displaying the output image, the at least one processor is optionally configured to employ at least one image processing algorithm to process the output image. Optionally, the at least one image processing algorithm is at least one of: an image cropping algorithm, an image flipping algorithm, an image rotating algorithm, an image resizing algorithm, an image orientation algorithm, an image colour-change algorithm, an image merging algorithm, an image slicing algorithm, an image layering algorithm, an image blending algorithm, an image special-effects algorithm, a virtual object generation algorithm.

Optionally, the output image is processed (by the at least one processor) to generate at least one XR image by digitally superimposing at least one virtual object upon the output image. Herein, the term "virtual object" refers to a computer-generated object (namely, a digital object). Examples of the at least one virtual object may include, but are not limited to, a virtual navigation tool, a virtual gadget, a virtual message, a virtual entity, a virtual entertainment media, a virtual vehicle or part thereof, and a virtual information.

DETAILED DESCRIPTION OF THE DRAWINGS

Figure 3:
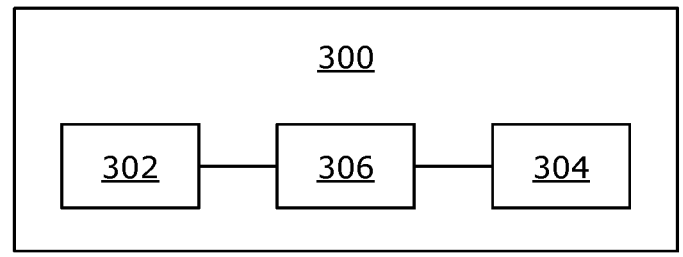
FIG. 3 illustrates a block diagram of an architecture of an imaging system employing cameras having different distortion profiles, in accordance with an embodiment of the present disclosure.

Referring to FIG. 3, illustrated is a block diagram of an architecture of an imaging system 300 employing cameras having different distortion profiles, in accordance with an embodiment of the present disclosure. The imaging system 300 comprises a first camera 302, a second camera 304, and at least one processor (depicted as a processor 306). The processor 306 is communicably coupled to the first camera 302 and the second camera 304.

It may be understood by a person skilled in the art that the FIG. 3 includes a simplified architecture of the imaging system 300 for sake of clarity, which should not unduly limit the scope of the claims herein. It is to be understood that the specific implementations of the imaging system 300 are provided as examples and are not to be construed as limiting it to specific numbers or types of cameras. The person skilled in the art will recognize many variations, alternatives, and modifications of embodiments of the present disclosure. For example, the imaging system 300 may comprise more than one first camera and more than one second camera.

Figure 4A:
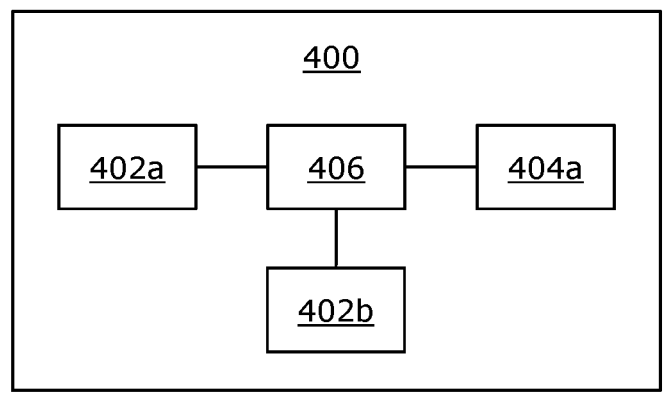
FIGS. 4A and 4B illustrate block diagrams of an architecture of a device employing cameras having different distortion profiles, in accordance with an embodiment of the present disclosure.
Figure 4B:
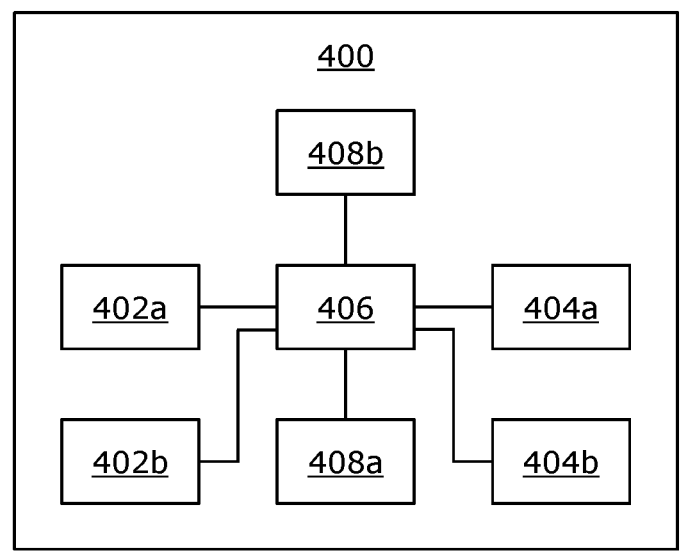

Referring to FIGS. 4A and 4B, illustrated are block diagrams of an architecture of a device 400 employing cameras having different distortion profiles, in accordance with different embodiments of the present disclosure. The device 400 comprises a first camera per eye (depicted as first cameras 402a and 402b for a left eye and a right eye of a user, respectively), at least one second camera (depicted as a second camera 404a in FIG. 4A, and depicted as second cameras 404a and 404b in FIG. 4B), and at least one processor (depicted as a processor 406). The processor 406 is communicably coupled to the first cameras 402a and 402b, and to the second cameras 404a and 404b. With reference to FIG. 4B, the device 400 optionally comprises at least one light source per eye (depicted as light sources 408a and 408b for the left eye and the right eye, respectively). It will be appreciated that in FIG. 4A, the device 400 is implemented as a teleport device, whereas in FIG. 4B, the device 400 is implemented as a head-mounted display (HMD) device.

It may be understood by a person skilled in the art that the FIGS. 4A and 4B include simplified architectures of the device 400 for sake of clarity, which should not unduly limit the scope of the claims herein. It is to be understood that the specific implementations of the device 400 are provided as examples and are not to be construed as limiting it to specific numbers or types of cameras and to specific numbers or types of light sources. The person skilled in the art will recognize many variations, alternatives, and modifications of embodiments of the present disclosure.

Referring to FIGS. 5A and 5B, illustrated are various image segments of an output image 500, in accordance with different embodiments of the present disclosure. The output image 500 is generated from a first image (not shown) and a second image (not shown). The output image 500 comprises an inner image segment 502, and a peripheral image segment 504 surrounding the inner image segment 502. In FIG. 5B, the output image 500 further comprises an intermediate image segment 506 between the inner image segment 502 and the peripheral image segment 504.

Referring to FIGS. 6A and 6B, FIG. 6A illustrates an exemplary graphical representation of a distortion profile of a first camera (not shown), while FIG. 6B illustrates an exemplary graphical representation of a distortion profile of a second camera (not shown), in accordance with an embodiment of the present disclosure. Herein, a positive X-axis represents a positive distortion, a negative X-axis represents a negative distortion, and a positive Y-axis represents a half-angular width of a given field of view of a given camera.

In FIG. 6A, it is represented that the first camera has a negative distortion which increases with an increase in a half-angular width of a first field of view of the first camera, the negative distortion being zero at a zero angular width of the first field of view.

In FIG. 6B, it is represented that the second camera has a negative distortion zone till a half-angular width 'Q' of a second field of view of the second camera, the negative distortion being zero at a zero angular width of the second field of view. Such a negative distortion zone corresponds to a portion of the second field of view that fully overlaps with the first field of view. Furthermore, the second camera has a positive distortion for half-angular width greater than 'Q'. Such a positive distortion corresponds to a remaining portion of the second field of view (that does not overlap with the first field of view). The half-angular width 'Q' is indicative of a point where a blending between a first image and an overlapping image segment of a second image begins.

Figure 7A:
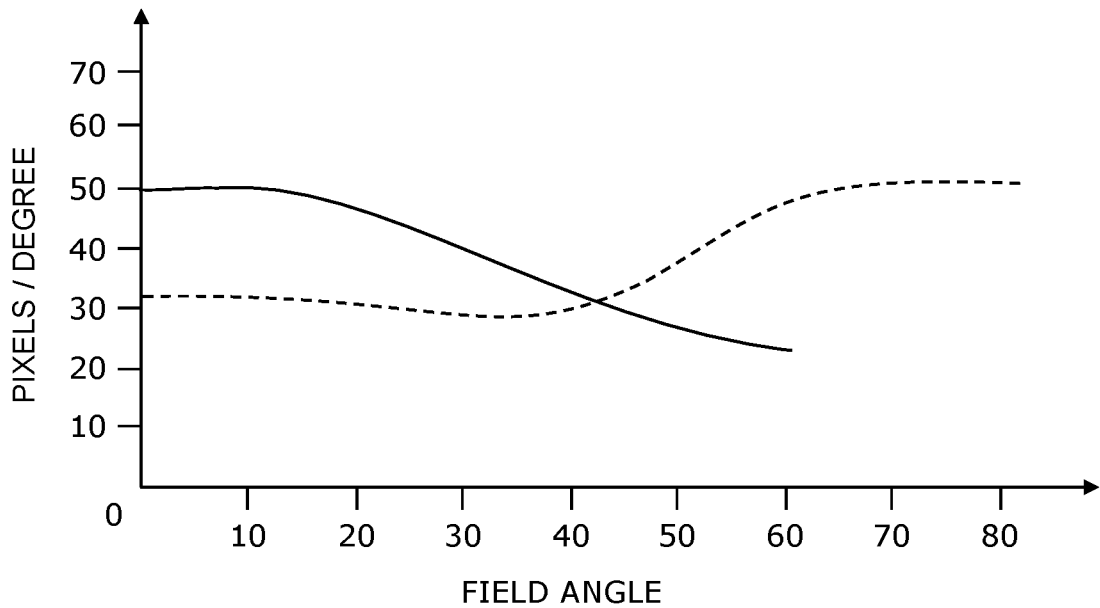

Referring to FIG. 7A, illustrated is an exemplary graphical representation of a resolution of a given image as a function of a half-angular width of a given field of view of a given camera, in accordance with an embodiment of the present disclosure. A solid-line curve represents a resolution of a first image as a function of a half-angular width of a first field of view of a first camera. As shown, the resolution of the first image is higher towards a central region of the first image corresponding to a half-angular width of the first field of view that ranges between 0 degrees to 35 degrees, as compared to a remaining region of the first image corresponding to a half-angular width of the first field of view that ranges between 35 degrees to 60 degrees.

A dotted-line curve represents a resolution of a second image as a function of a half-angular width of a second field of view of a second camera. As shown, the resolution of the second image is higher towards a non-overlapping image segment of the second image corresponding to a half-angular width of the second field of view that ranges between 35 degrees to 80 degrees, as compared to an overlapping image segment of the second image corresponding to a half-angular width of the second field of view that ranges between 0 degrees to 35 degrees.

Figure 7B:
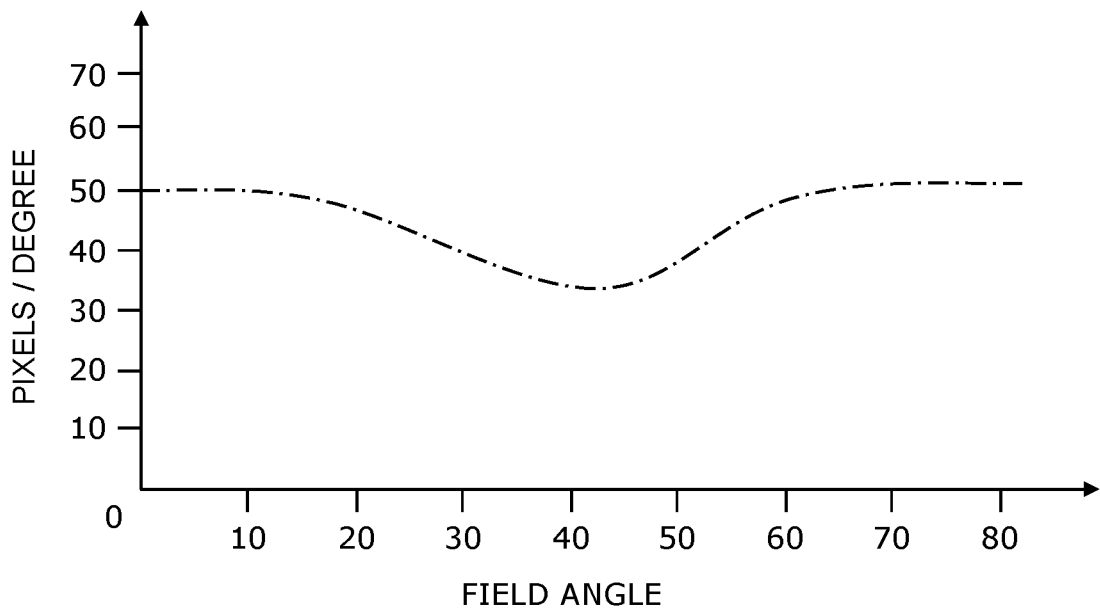
FIG. 7B illustrates an exemplary graphical representation of a resolution of an output image, in accordance with an embodiment of the present disclosure.

Referring to FIG. 7B, illustrated is an exemplary graphical representation of a resolution of an output image, in accordance with an embodiment of the present disclosure. The output image is generated from the first image and the second image. Herein, a dash-dot line curve indicates that a net (high) resolution (as achieved from a combination of the first camera and the second camera) across an entirety of the output image is nearly same throughout its field of view. From the curve, it can be inferred that the output image has an acceptable high image quality throughout the field of view.

Figure 8:
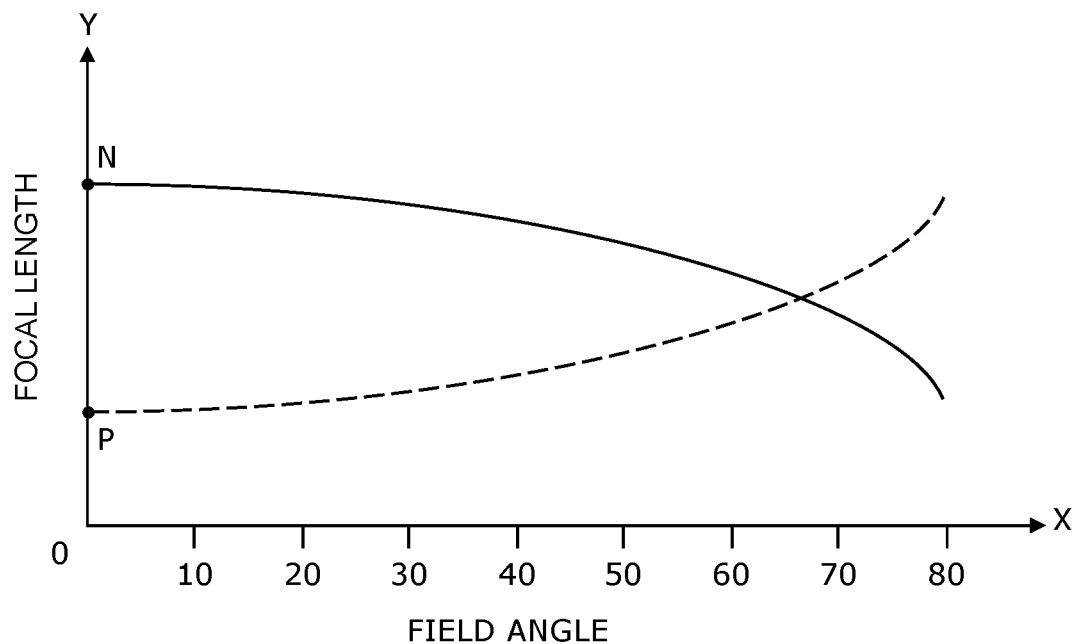
FIG. 8 illustrates an exemplary graphical representation of a variation of a focal length of a given camera as a function of a half-angular width of a given field of view of the given camera, in accordance with an embodiment of the present disclosure.

Referring to FIG. 8, illustrated is an exemplary graphical representation of a variation of a focal length of a given camera as a function of a half-angular width of a given field of view of the given camera, in accordance with an embodiment of the present disclosure. Herein, an X-axis represents the half-angular width of the given field of view of the given camera, and Y-axis represents the focal length of the given camera.

A solid-line curve represents the variation of the focal length of the given camera for a negative distortion of the given camera. As shown, the focal length (for example, represented by 'N') is highest at a central region of the given field of view (i.e., when the half-angular width of the given field of view is 0 degree), and decreases with an increase in the half-angular width of the given field of view i.e., towards a peripheral region of the given field of view. In such a case, the focal length of the given camera may be suitably adjusted for capturing a high-resolution image (of a real-world scene) corresponding to a central region of the given field of view.

A dashed-line curve represents the variation of the focal length of the given camera for a positive distortion of the given camera. As shown, the focal length (for example, represented by 'P') is lowest at a central region of the given field of view (i.e., when the half-angular width of the given field of view is 0 degree), and then increases with an increase in the half-angular width of the given field of view i.e., towards a peripheral region of the given field of view. In such a case, the focal length of the given camera could be adjusted accordingly, for capturing a high-resolution image corresponding to a peripheral region of the given field of view.

Figure 9:
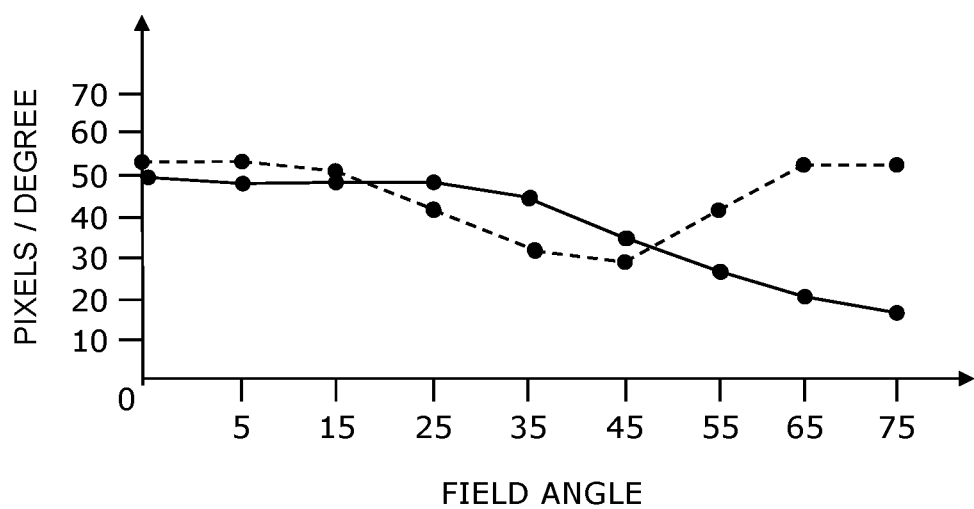
FIG. 9 illustrates an exemplary comparison between an angular resolution of an output image and an angular resolution provided by a light source, in accordance with an embodiment of the present disclosure.

Referring to FIG. 9, illustrated is an exemplary comparison between an angular resolution of an output image (not shown) and an angular resolution provided by a light source (not shown) as a function of a half-angular width of a field of view of the output image, in accordance with an embodiment of the present disclosure. A trend of the angular resolution of the output image is depicted using a dotted-line curve, whereas a trend of the angular resolution provided by the light source is depicted using a solid-line curve. As shown, the trend of the angular resolution of the output image almost matches with the trend of the angular resolution provided by the light source. In an example, for half-angular widths of field of view of the output image of 0, 5, 15, 25, 35, 45, 55, 65, and 75 degrees, the angular resolution (in pixels per degree) of the output image and the angular resolution (in pixels per degree) provided by the light source may be (52 vs 50), (52 vs 48), (50 vs 47), (43 vs 49), (35 vs 43), (32 vs 37), (40 vs 25), (52 vs 20), and (51 vs 18), respectively. It will be appreciated that according to both the aforementioned trends, it can be inferred an entirety of the output image (generated using a first image and a second image) has a high resolution throughout, i.e., an acceptable high image quality throughout.

Modifications to embodiments of the present disclosure described in the foregoing are possible without departing from the scope of the present disclosure as defined by the accompanying claims. Expressions such as "including", "comprising", "incorporating", "have", "is" used to describe and claim the present disclosure are intended to be construed in a non-exclusive manner, namely allowing for items, components or elements not explicitly described also to be present. Reference to the singular is also to be construed to relate to the plural.

The invention claimed is:
1. An imaging system comprising:
a first camera having a negative distortion;
a second camera, a second field of view of the second camera being wider than a first field of view of the first camera, wherein the first camera and the second camera are arranged in a manner that the first field of view fully overlaps with a portion of the second field of view, the second camera having a negative distortion at said portion of the second field of view and a positive distortion at a remaining portion of the second field of view; and
at least one processor configured to:
control the first camera and the second camera to capture simultaneously a first image and a second image of a real-world environment, respectively;
determine an overlapping image segment and a non-overlapping image segment of the second image corresponding to said portion and the remaining portion of the second field of view, respectively; and
generate an output image from the first image and the second image, wherein:
an inner image segment of the output image is generated from at least one of: the first image, the overlapping image segment of the second image, and
a peripheral image segment of the output image is generated from the non-overlapping image segment of the second image, the peripheral image segment surrounding the inner image segment.

2. The imaging system of claim 1, wherein a pixel in an intermediate image segment between the inner image segment and the peripheral image segment is generated by combining a corresponding pixel of the first image with a corresponding pixel of the overlapping image segment of the second image.

3. The imaging system of claim 1, wherein the at least one processor is configured to warp one of the first image and the second image to match a perspective from which another of the first image and the second image is captured, prior to generating the output image from the first image and the second image.

4. The imaging system of claim 1, wherein a value of the negative distortion of the first camera lies in a range of −20 to −70.

5. The imaging system of claim 1, wherein a value of the negative distortion of the second camera at said portion of the second field of view lies in a range of 0 to −40, or in a range of −20 to −40.

6. The imaging system of claim 1, wherein a value of the positive distortion of the second camera at the remaining portion of the second field of view lies in a range of +3 to +40.

7. The imaging system of claim 1, wherein a value of the distortion of the second camera at a boundary between the portion of the second field of view and the remaining portion of the second field of view lies in a range of −3 to +3.

8. The imaging system of claim 1, wherein the first field of view has an angular width that lies in a range of 45 degrees to 150 degrees.

9. The imaging system of claim 1, wherein the second field of view has an angular width that lies in a range of 50 degrees to 220 degrees.

10. The imaging system of claim 1, wherein a resolution of the first image lies in a range of 20 pixels per degree to 120 pixels per degree.

11. The imaging system of claim 1, wherein a resolution of the overlapping image segment of the second image lies in a range of 15 pixels per degree to 100 pixels per degree, and a resolution of the non-overlapping image segment of the second image lies in a range of 20 pixels per degree to 120 pixels per degree.

12. The imaging system of claim 1, wherein an average distortion across an entirety of the second field of view of the second camera is within a predefined value from a distortion at an edge of at least one light source via which the output image is to be displayed.

13. A device comprising:
a first camera per eye, the first camera having a negative distortion;
at least one second camera, a second field of view of the at least one second camera being wider than a first field of view of the first camera, wherein the first camera and the at least one second camera are arranged in a manner that the first field of view fully overlaps with a portion of the second field of view, the at least one second camera having a negative distortion at said portion of the second field of view and a positive distortion at a remaining portion of the second field of view; and
at least one processor configured to:
control the first camera and the at least one second camera to capture simultaneously a first image and a second image of a real-world environment, respectively;
determine an overlapping image segment and a non-overlapping image segment of the second image corresponding to said portion and the remaining portion of the second field of view, respectively; and
generate an output image from the first image and the second image, wherein:
an inner image segment of the output image is generated from at least one of: the first image, the overlapping image segment of the second image, and
a peripheral image segment of the output image is generated from the non-overlapping image segment of the second image, the peripheral image segment surrounding the inner image segment.

14. The device of claim 13, further comprising at least one light source per eye, wherein the at least one processor is configured to display the output image via the at least one light source.

15. The device of claim 13, wherein a pixel in an intermediate image segment between the inner image segment and the peripheral image segment is generated by combining a corresponding pixel of the first image with a corresponding pixel of the overlapping image segment of the second image.

16. The device of claim 13, wherein the at least one processor is configured to warp one of the first image and the second image to match a perspective from which another of the first image and the second image is captured, prior to generating the output image from the first image and the second image.

17. The device of claim 13, wherein a value of the negative distortion of the first camera lies in a range of −20 to −70.

18. The device of claim 13, wherein a value of the negative distortion of the at least one second camera at said portion of the second field of view lies in a range of 0 to −40, or in a range of −20 to −40.

19. The device of claim 13, wherein a value of the positive distortion of the at least one second camera at the remaining portion of the second field of view lies in a range of +3 to +40.

20. The device of claim 13, wherein a value of the distortion of the at least one second camera at a boundary between the portion of the second field of view and the remaining portion of the second field of view lies in a range of −3 to +3.

21. The device of claim 13, wherein the first field of view has an angular width that lies in a range of 45 degrees to 150 degrees.

22. The device of claim 13, wherein the second field of view has an angular width that lies in a range of 50 degrees to 220 degrees.

23. The device of claim 13, wherein a resolution of the first image lies in a range of 20 pixels per degree to 120 pixels per degree.

24. The device of claim 13, wherein a resolution of the overlapping image segment of the second image lies in a range of 15 pixels per degree to 100 pixels per degree, and a resolution of the non-overlapping image segment of the second image lies in a range of 20 pixels per degree to 120 pixels per degree.

25. The device of claim 13, wherein an average distortion across an entirety of the second field of view of the second camera is within a predefined value from a distortion at an edge of at least one light source of the device.

\* \* \* \* \*